(12) United States Patent
Peterson et al.

(10) Patent No.: US 11,579,957 B1
(45) Date of Patent: Feb. 14, 2023

(54) DISTRIBUTED WATCHDOG TIMER AND ACTIVE TOKEN EXCHANGE

(71) Applicant: Xilinx, Inc., San Jose, CA (US)

(72) Inventors: Edward S. Peterson, Queen Creak, AZ (US); Trevor W. Hardcastle, Albuquerque, NM (US); Carl H. Carmichael, Eugene, OR (US)

(73) Assignee: XILINX, INC., San Jose, CA (US)

( * ) Notice: Subject to any disclaimer, the term of this patent is extended or adjusted under 35 U.S.C. 154(b) by 251 days.

(21) Appl. No.: 16/938,764

(22) Filed: Jul. 24, 2020

(51) Int. Cl.
*G06F 11/07* (2006.01)
*G06F 11/30* (2006.01)
*G06F 11/34* (2006.01)

(52) U.S. Cl.
CPC ...... *G06F 11/0757* (2013.01); *G06F 11/0793* (2013.01); *G06F 11/3055* (2013.01); *G06F 11/3419* (2013.01)

(58) Field of Classification Search
CPC ............. G06F 11/0757; G06F 11/0793; G06F 11/3055; G06F 11/3419
See application file for complete search history.

(56) References Cited

U.S. PATENT DOCUMENTS

| | | | | |
|---|---|---|---|---|
| 4,811,200 A * | 3/1989 | Wagner | ............... | G06F 11/1415 714/E11.003 |
| 5,729,472 A * | 3/1998 | Seiffert | ............... | G06F 11/0757 709/224 |
| 6,321,344 B1 * | 11/2001 | Fenchel | ............... | G06F 11/0757 714/E11.003 |
| 8,375,258 B1 * | 2/2013 | Sheets | ................. | G06F 11/0721 714/55 |
| 2004/0225831 A1 * | 11/2004 | Pail | ........................ | G06F 11/073 711/105 |
| 2011/0283149 A1 * | 11/2011 | Richmond | .......... | G06F 11/3055 714/39 |
| 2013/0093587 A1 * | 4/2013 | Gonsalves | ............. | G08B 21/02 340/539.11 |
| 2015/0095724 A1 * | 4/2015 | Park | ................... | G05B 23/0221 714/55 |
| 2018/0285217 A1 * | 10/2018 | Smith | ..................... | G06F 21/00 |

OTHER PUBLICATIONS

Security Monitor 5.0 User Guide, Section 7.10 "Security Monitor Watchdog", 2019, 3 pages.

* cited by examiner

*Primary Examiner* — Jonathan D Gibson
(74) *Attorney, Agent, or Firm* — Patterson + Sheridan, LLP

(57) ABSTRACT

A system includes a plurality of watchdog components. Each watchdog component is configured to receive a kick signal from its monitored function to determine whether the monitored function is active. Each watchdog component is further configured to receive a respective token from all watchdog components that the each watchdog component is connected to. The respective token determines whether its respective watchdog component has timed out. Each watchdog component is further configured to generate a token responsive to the kick signal and further responsive to the respective token from all watchdog component that the each watchdog component is connected to. Each watchdog component is further configured to transmit the generated token to the all watchdog components that the each watchdog component is connected to.

20 Claims, 6 Drawing Sheets

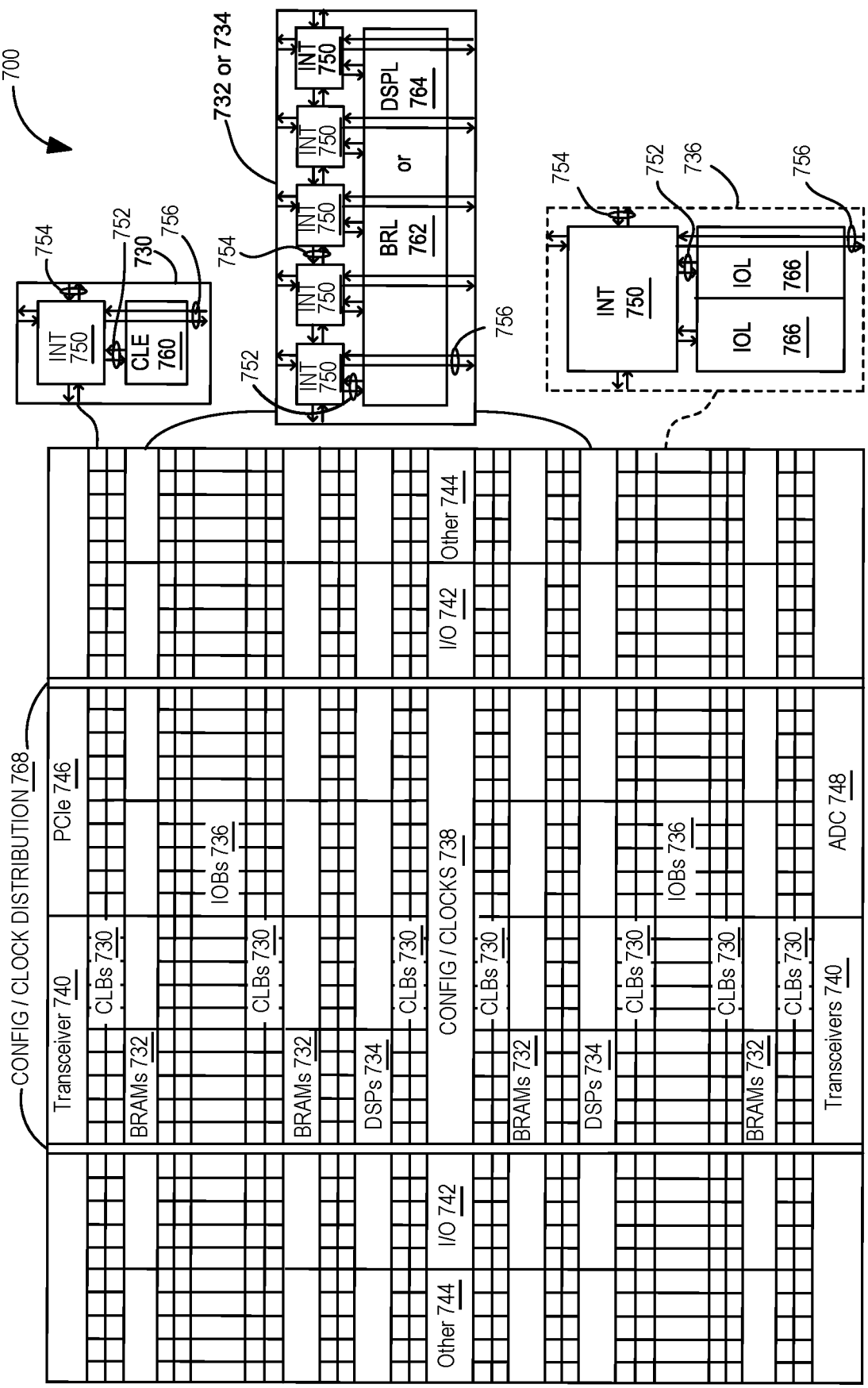

DISTRIBUTED WATCHDOG TIMER AND ACTIVE TOKEN EXCHANGE

TECHNICAL FIELD

The disclosure generally relates to implementation of watchdogs in a system and more particularly to implementing distributed watchdogs.

BACKGROUND

Typically, watchdogs are used to monitor whether a system or a component within a system is active or is inactive. Generally, a function that is monitored periodically indicates to its watchdog whether the function is still active. Once the watchdog receives an indication that the function is still active, it resets its timer and restarts counting until the next activity indication is received. If the activity indication is not received within the given period or if the watchdog receives an indication that the monitored function is inactive, then the watchdog alerts the system that the activity of the function being monitored has been hindered. Typically, watchdogs in a distributed system are implemented independent from one another, requiring a top-level supervisory function to manage all the watchdogs. The top-level supervisory function checks the status of each watchdog and alerts the system if any of the watchdogs indicates that its associated monitored function has been hindered.

Unfortunately, having a top-level supervisory function creates a security risk, by creating a single point of failure/attack at the top-level supervisory function, by an attacker. Moreover, using a top-level supervisory function to monitor all the watchdogs underneath it places a heavy burden, from a resource standpoint as well as processing, on the top-level supervisory function. Additionally, a top-level supervisory function does not check whether the watchdogs themselves are operational.

SUMMARY

Accordingly, it is desirable to implement distributed watchdogs to alleviate the security risk with respect to a single point of failure/attack. Moreover, it is desirable to implement a distributed watchdog system to create redundancy and checks between the watchdogs themselves, thereby improving over the conventional system. Furthermore, it is advantageous to implement a distributed watchdog system to alleviate the heavy burden (resources/processing) from one single point and to distribute it amongst the watchdogs.

In some embodiments, a distributed watchdog system is implemented such that each watchdog monitored function is communicatively coupled to its respective watchdog, i.e. indicating whether the monitored application is still active or inactive. If the monitored function is inactive then the watchdog times out. The watchdogs that are distributed throughout the system communicate with one another instead of communicating to the top-level supervisory function. For example, each watchdog may communicate to its adjacent neighboring watchdog. Any given watchdog in the distributed system times out if it does not receive an indication (within a specific period of time) that its respective monitored function is active or if any of its neighboring watchdogs times out. If any of the watchdogs times out then eventually every single watchdog within the distributed system times out. In contrast, if each watchdog in the distributed system receives an indication from its respective monitored function that it is still active and further receives an indication from all neighboring watchdog that each of those neighboring watchdogs is active, then the watchdog resets its timer and starts counting down again until it times out or until it receives an indication from its monitored function and all of its neighboring watchdogs that they are active.

In some embodiments, a system includes a plurality of watchdog components. Each watchdog component is configured to receive a kick signal from its monitored function to determine whether the monitored function is active. Each watchdog component is further configured to receive a respective token from all watchdog components that the each watchdog component is connected to. The respective token determines whether its respective watchdog component has timed out. Each watchdog component is further configured to generate a token responsive to the kick signal and further responsive to the respective token from all watchdog component that the each watchdog component is connected to. Each watchdog component is further configured to transmit the generated token to the all watchdog components that the each watchdog component is connected to.

It is appreciated that absence of receiving the kick signal may be indicative of the monitored function being inactive. It is appreciated that the absence of receiving a respective token from one watchdog component of the all watchdog components indicates that the one watchdog component has timed out.

According to some embodiments, the token is generated in response to the kick signal indicating that the monitored function is active and further in response to receiving the respective token from the all watchdog components that the each watchdog component is connected and indicating that the all watchdog components that the each watchdog component is connected to have not timed out. In some nonlimiting examples, a timer associated with the each watchdog component is reset responsive to the kick signal indicating that the monitored function is active and further in response to receiving the respective token from the all watchdog components that the each watchdog component is connected to indicating that the all watchdog components that the each watchdog component is connected to have not timed out.

It is appreciated that in some embodiments, the each watchdog component of the plurality of watchdog components determines that the monitored function is active if the kick signal from its monitored function is received within a first predetermined period of time. In one nonlimiting example, the first predetermined period of time is user programmable.

It is further appreciated that the each watchdog component of the plurality of watchdog components generates the token in response to receiving the kick signal within the first predetermined period of time and further in response to receiving the respective token from the all watchdog components within a second predetermined period of time that the each watchdog component is connected to. It is appreciated that the second predetermined period of time may be user programmable.

In some embodiments the system may include a first watchdog component and a first plurality of watchdog components connected to the first watchdog component. The first watchdog component is configured to receive a first plurality of kick signals from a first monitored function. Each kick signal of the first plurality of kick signals is received within a first period of time and at regular intervals from one another. Each kick signal of the first plurality of kick signals determines whether the first monitored function is active. The first watchdog component times out if a kick signal of the first plurality of kick signals is not received within the first period of time. It is appreciated that each watchdog component of the first plurality of watchdog component is configured to generate and transmit a token within a second period of time to the first watchdog component at regular intervals indicating whether the each watchdog component or any other watchdog components connected that the each watchdog component is connected to has timed out. According to one nonlimiting example, the first watchdog component is configured to receive tokens from the first plurality of watchdog components connected thereto. It is appreciated that the first watchdog component is further configured to generate and transmit a token to the first plurality of watchdog components in response to the first watchdog component not timing out and further in response to the received tokens indicating that the each watchdog component of the first plurality of watchdog components and its respective watchdog components connected thereto have not timed out.

It is appreciated that absence of receiving the each kick signal of the first plurality of kick signals within the first period of time indicates that the first monitored function is inactive. According to some embodiments, absence of receiving a respective token from one watchdog component of the first plurality of watchdog components indicates that the one watchdog component has timed out.

According to some embodiments, the one watchdog component times out responsive to absence of receiving a kick signal from its respective monitored function within a predetermined period of time or in response to any one of its watchdog components connected thereto timing out. In some nonlimiting examples, the first watchdog component times out responsive to any watchdog component of the first plurality of watchdog components timing out.

A first kick signal is received from a first monitored function, at a first watchdog component. The first kick signal may be indicative of whether the first monitored function is active or inactive. It is appreciated that absence of receiving the kick signal within the time interval may be an indicative that the function being monitored is inactive. The first watchdog component is timed out absent of receiving a second kick signal from the first monitored function within a first predetermined period of time or in responsive to the second kick signal indicating that the first monitored function is inactive. A first plurality of tokens is received from a first plurality of watchdog components connected to the first watchdog component, within the first predetermined period of time. It is appreciated that each token of the first plurality of tokens may be associated with its respective watchdog component of the first plurality of watchdog components and indicative of whether the respective watchdog component of the first plurality of watchdog components has timed out. The first watchdog component is timed out absent receiving a token from a second watchdog component within the first predetermined period of time. The second watchdog component is connected to the first watchdog component. The first watchdog component is timed out responsive to any token of the first plurality of tokens indicating that its respective watchdog component has timed out. A token is generated and transmitted from the first watchdog component to the second watchdog component and to the first plurality of watchdog components responsive to the first watchdog component not timing out.

It is appreciated that the time intervals to receive the kick signals and/or the tokens from respective neighboring watchdog components may be programmable, e.g., user programmable. It is also appreciated that subsequent to the generating and transmitting the token, additional tokens may be generated and transmitted within regular intervals to the second watchdog component and further to the first plurality of watchdog components if the first watchdog component has not timed out.

It is appreciated that a watchdog component within the first plurality of watchdog component times out responsive to a failure to receive a kick signal within a predetermine period of time or in response to receiving a kick signal indicating that its monitored function is inactive. Moreover, a watchdog component within the first plurality of watchdog components times out responsive to any watchdog component connected thereto timing out or responsive to absent of receiving a token from any watchdog component connected thereto with a predetermined period of time.

It is appreciated that each watchdog component of the first plurality of watchdog components is associated with its own monitored function.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 6 is a field programmable gate array (FPGA) implementation of the programmable IC, according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
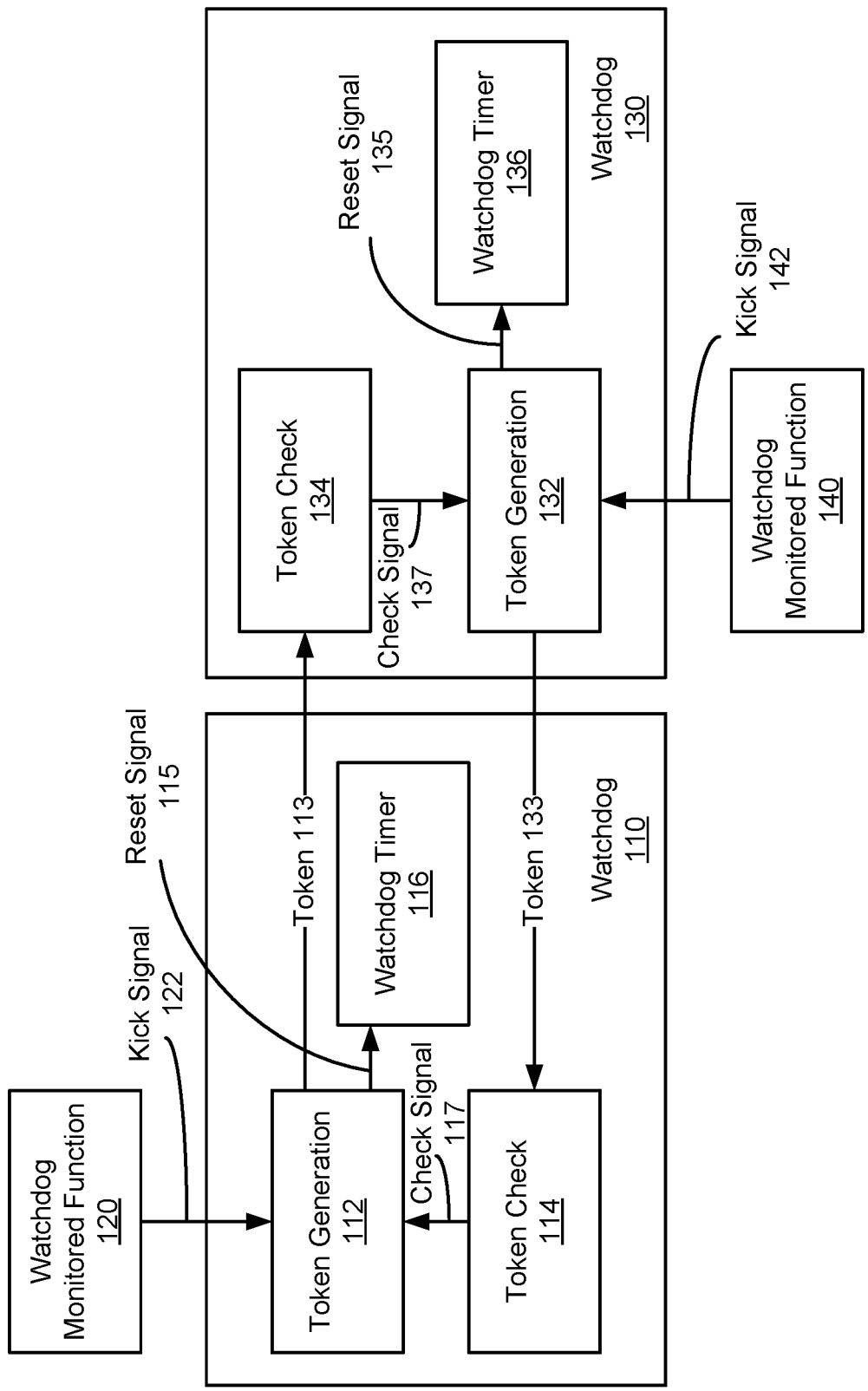
FIG. 1 shows a distributed watchdog system, according to some examples.

Examples described herein relate to a distributed watchdog system. A distributed watchdog system is used, as a nonlimiting example, for a product that is spread across multiple instances of hardware/software across a large area where each instance of hardware/software being active plays an important role in the product functioning properly. The distributed watchdog system according to some embodiments creates multiple watchdogs and watchdog timers that communicate with one another to detect a failure at any given point of the distributed watchdog system.

In some distributed watchdog system embodiments, each watchdog is communicatively coupled to other watchdogs where each watchdog passes an activity token to watchdogs that it is connected to. The activity token indicates whether the monitored function is still active and whether all other watchdogs connected to a given watchdog are still active. If the monitored function becomes inactive the watchdog times out. Moreover, the watchdog times out if any of the watchdogs that a given watchdog is connected to becomes inactive (e.g., by timing out because its respective monitored function becomes inactive or because a watchdog connected thereto times out). Accordingly, if any watchdog times out, every watchdog in the system times out. In other words, a watchdog timing out ripples through the distributed system where every watchdog times out eventually. It is appreciated that the distributed watchdog system according to some embodiments allows each watchdog to automatically check the activity of its respective function, thereby implementing an automated distributed watchdog system. Moreover, connectivity of the watchdogs to one another creates a redundancy and checks whether the connected watchdogs are also operational.

Accordingly, the security risk associated with a single point of failure/attack is alleviated. Moreover, the distributed nature of the watchdog system alleviates the heavy burden (resources/processing) from one single point and distributes it amongst the watchdogs.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

FIG. 1 shows a distributed watchdog system, according to some examples. In some nonlimiting examples, the distributed watchdog system includes a watchdog component 110 that is coupled to its adjacent watchdog component 130. The watchdog component 110 is also coupled to its respective watchdog monitored function 120 and the watchdog component 130 is coupled to its respective watchdog monitored function 140.

In some nonlimiting examples, the watchdog monitored function is the component that is being monitored to determine whether it remains active and operational. In some examples, the monitored function may be a sensor monitoring component, a security monitoring function in a processing system, a security monitoring function in a programmable logic, e.g., a field programmable gate array (FPGA) device and its fabric, any function that some event occurs periodically, etc. It is appreciated that in some embodiments, the components being monitored may be distributed across a single die. However, it is appreciated that in some nonlimiting examples the components may be distributed across multiple dies, e.g., in a 2.5 configuration, in a 3D configuration, etc. It is appreciated that the 2.5 configuration refers to embodiments where at least two dies are packaged in a single package in a plan and connected through silicon interposer, e.g., flip-chip silicon interposer, whereas the 3D configuration the interposer and dies are stacked on one another, e.g., dies interact with one another through through silicon vias (TSV).

It is appreciated that illustrating two watchdog components connected to one another is for illustrative purposes and should not be construed as limiting the scope of the embodiments. For example, a watchdog component may be connected to multiple adjacent watchdog components. Moreover, it is appreciated that illustrating a watchdog component with a single watchdog monitored function is for illustrative purposes and should be construed as limiting the scope of the embodiments. For example, one watchdog component may be associated with multiple watchdog monitored functions.

In the illustrated nonlimiting example, the watchdog component 110 includes a token generation unit 112, a token check unit 114, and a watchdog timer 116. It is appreciated that the watchdog monitored function 120 may generate a kick signal 122 at regular intervals, e.g., once every 3 ms, once every 6 ns, once every minute, etc., as long as the function being monitored is operational. It is appreciated that in some embodiments, the kick signal 122 may be generated even if the function being monitored is inactive but it may have a value that indicates that the function being monitored has become inactive. It is appreciated that in some embodiments, the watchdog monitored function 120 may fail to generate the kick signal 122 if the function being monitored becomes inactive or nonoperational. As such, absence of receiving the kick signal 122 may also be an indication that the function being monitored has failed or has become inactive.

The token check unit 114 in some embodiments, receives tokens from neighboring or adjacent watchdog components. For example, the token check unit 114 is configured to receive token 133 from the watchdog component 130, at a particular time intervals. It is appreciated that the time interval that the tokens are received from neighboring or adjacent watchdog components may or may not be the same as the intervals that the kick signals, e.g., kick signal 122, are received from the watchdog monitored function 120. The token 133 is used to determine whether the watchdog component 130 has timed out. In some examples, the watchdog component 130 times out if its respective function being monitored becomes inactive or if any of its adjacent or neighboring watchdog components time out. The token check unit 114 receives the token 133 and checks to see whether the watchdog component 130 has timed out. The token check unit 114 generates a check signal 117, indicative of whether the watchdog component 130 has timed out, and transmits the check signal 117 to the token generation unit 112. It is also appreciated that absence of receiving the token 133 within a particular time interval may be an indication that the watchdog 130 has timed out or has become nonoperational.

The token generation unit 112 may generate a reset signal 115 that is output to the watchdog timer 116 to reset the countdown as long as the watchdog monitored function 120 is active (i.e. a kick signal 122 is received at regular intervals) and as long as the neighboring or connected watchdog component 130 has not timed out. On the other hand, if the kick signal 122 is not received within the regular interval or if it is determined that the watchdog component 130 has timed out, then the watchdog timer 116 is not reset and causes the watchdog component 110 to time out.

The token generation unit 112 generates a token 113 that is transmitted to its neighboring or adjacent watchdog components, here watchdog component 130. The token 113 may be generated in response to the watchdog timer 116 not timing out or responsive to resetting the watchdog timer 116. In other embodiments, the token 113 may be generated regardless of whether the watchdog timer 116 is reset but the token 113 may have a value indicating whether the watchdog 110 has timed out, either because its function being monitored has become inactive or because the watchdog component 130 that it is connected to has timed out.

It is appreciated that the watchdog component 130 functions substantially similar to that of watchdog component 110. In the illustrated nonlimiting example, the watchdog component 130 includes a token generation unit 132, a token check unit 134, and a watchdog timer 136. It is appreciated that the watchdog monitored function 140 may generate a kick signal 142 at regular intervals, e.g., once every 3 ms, once every 6 ns, once every minute, etc., as long as the function being monitored is operational. It is appreciated that the time intervals that the kick signals are to be received for each watchdog component may be the same or may be different from one another in the distributed watchdog system. It is appreciated that in some embodiments, the kick signal 142 may be generated even if the function being monitored is inactive but it may have a value that indicates that the function being monitored has become inactive. It is appreciated that in some embodiments, the watchdog monitored function 140 may fail to generate the kick signal 142 if the function being monitored becomes inactive or non-operational. As such, absence of receiving the kick signal 142 may also be an indication that the function being monitored has failed or has become inactive.

The token check unit 134 in some embodiments, receives tokens from neighboring or adjacent watchdog components. For example, the token check unit 134 is configured to receive token 113 from the watchdog component 110, at a particular time intervals. It is appreciated that the time interval that the tokens are received from neighboring or adjacent watchdog components may or may not be the same as the intervals that the kick signals, e.g., kick signal 142, are received from the watchdog monitored function 140. The token 113 is used to determine whether the watchdog component 110 has timed out. In some examples, the watchdog component 110 times out if its respective function being monitored becomes inactive or if any of its adjacent or neighboring watchdog components time out. The token check unit 134 receives the token 113 and checks to see whether the watchdog component 110 has timed out. The token check unit 134 generates a check signal 137, indicative of whether the watchdog component 110 has timed out, and transmits the check signal 137 to the token generation unit 132. It is also appreciated that absence of receiving the token 113 within a particular time interval may be an indication that the watchdog 110 has timed out or has become nonoperational.

The token generation unit 132 may generate a reset signal 135 that is output to the watchdog timer 136 to reset the countdown as long as the watchdog monitored function 140 is active (i.e. a kick signal 142 is received at regular intervals) and as long as the neighboring or connected watchdog component 110 has not timed out. On the other hand, if the kick signal 142 is not received within the regular interval or if it is determined that the watchdog component 110 has timed out, then the watchdog timer 136 is not reset and causes the watchdog component 130 to time out.

The token generation unit 132 generates a token 133 that is transmitted to its neighboring or adjacent watchdog components, here watchdog component 110. The token 133 may be generated in response to the watchdog timer 136 not timing out or responsive to resetting the watchdog timer 136. In other embodiments, the token 133 may be generated regardless of whether the watchdog timer 136 is reset but the token 133 may have a value indicating whether the watchdog 130 has timed out, either because its function being monitored has become inactive or because the watchdog component 110 that it is connected to has timed out.

Figure 2:
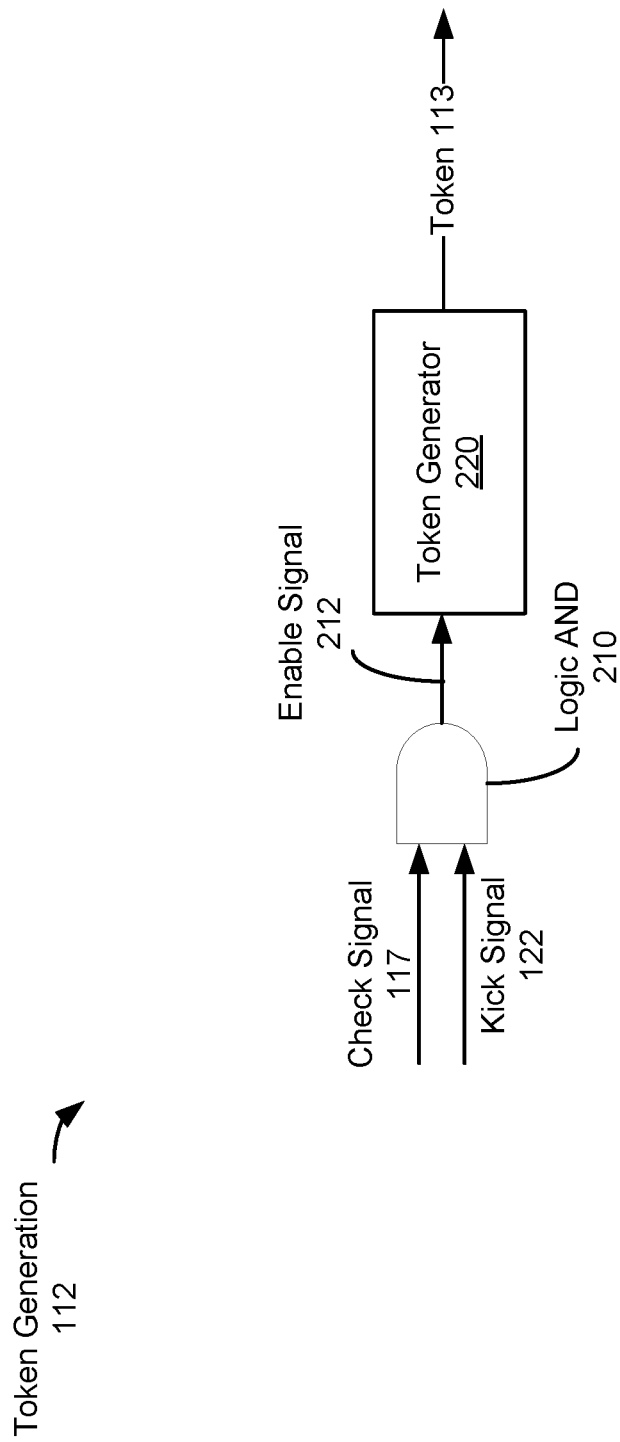
FIG. 2 shows a token generation unit, according to some embodiments.

FIG. 2 shows a token generation unit 112, according to some embodiments. In some embodiments, the token generation 112 unit may include a logic AND 210, and a token generator 220. It is appreciated that an enable signal 212 is generated by the logic AND 210 if the check signal 117 and the kick signal 122 both indicate that the function being monitored is active and that the neighboring watchdog component(s) has not timed out. The enable signal 212 causes the token generator 220 to generate the token 113. It is appreciated that the logic AND 210 is a two input logic AND for illustrative purposes but it may be any number of inputs. For example, if the watchdog component 110 is connected to two adjacent neighboring watchdog components then two check signals may be received, one for each watchdog component connected to the watchdog component 110 and one for the kick signal 122, hence a three input logic AND. It is also appreciated that a logical component other than a logic AND may be used. For example, logic OR may be used. As such, the use of logic AND to generate the enable signal 212 is for illustrative purposes and should not be construed as limiting the scope of the embodiments. It is appreciated that the token generation unit 132 may be substantially similar to the token generation unit 112, as described above.

Figure 3:
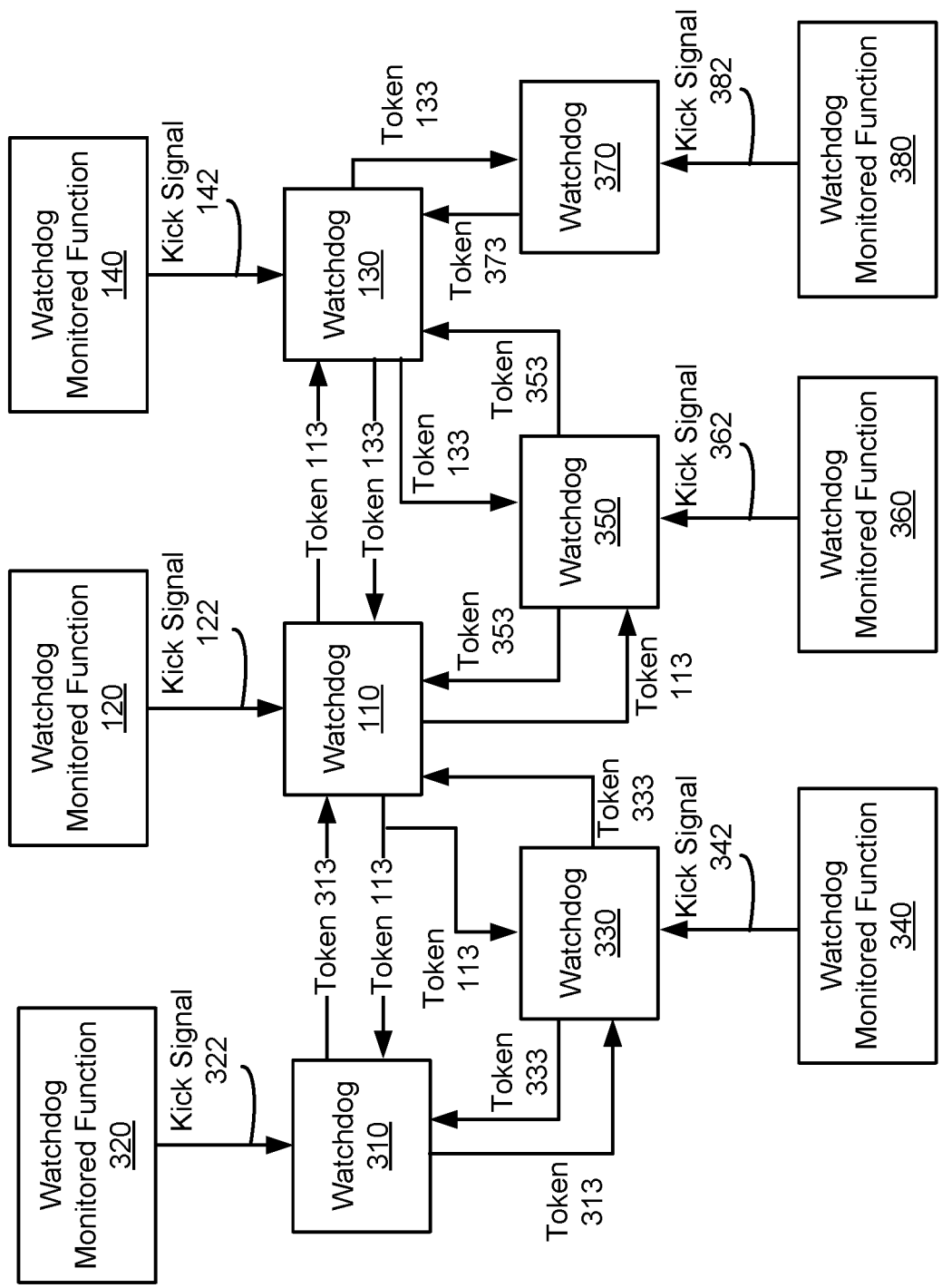
FIG. 3 shows another distributed watchdog system, according to some examples.

FIG. 3 shows another distributed watchdog system, according to some examples. The illustrated distributed watchdog system includes watchdog component 310 that is directly coupled to its neighboring watchdog components 110 and 330, the watchdog component 110 that is directly coupled to its neighboring watchdog components 310, 330, 350, and 130, the watchdog component 330 that is directly coupled to its neighboring watchdog components 110 and 310, the watchdog component 130 that is directly coupled to its neighboring watchdog components 110, 350, and 370, the watchdog component 350 that is directly coupled to its neighboring watchdog components 110 and 130, and the watchdog component 370 that is directly coupled to its neighboring watchdog component 130. It is appreciated that each watchdog component may be substantially similar to watchdog components 110 and 130 as described in FIGS. 1 and 2. It is further appreciated that each watchdog component may be coupled to its respective watchdog monitored function. For example, the watchdog component 310 may be coupled to its respective watchdog monitored function 320, the watchdog component 330 may be coupled to its respective watchdog monitored function 340, the watchdog component 110 may be coupled to its respective watchdog monitored function 120, the watchdog component 350 may be coupled to its respective watchdog monitored function 360, the watchdog component 130 may be coupled to its respective watchdog monitored function 140, and the watchdog component 370 may be coupled to its respective watchdog monitored function 380.

It is appreciated that each watchdog monitored function may generate its respective kick signal, as described above. For example, the watchdog monitored function 320 may generate kick signal 322, the watchdog monitored function 120 may generate kick signal 122, the watchdog monitored function 140 may generate kick signal 142, the watchdog monitored function 340 may generate kick signal 342, the watchdog monitored function 380 may generate kick signal 382, and the watchdog monitored function 360 may generate kick signal 362. As described above, each kick signal may have a value indicative of whether the function being monitored is active or inactive. Moreover, as described above, absent of receiving a kick signal may be an indication that the monitored function is inactive or nonoperational.

It is appreciated that each watchdog component may generate a token at regular intervals if its respective function being monitored is active and if its neighboring watchdog components are active. In other words, the token may be generated if the timer of each respective watchdog has been reset. It is appreciated that in some embodiments, the token may be generated regardless of whether its respective function being monitored is active/inactive and regardless of whether its neighboring connected watchdog components have timed out or not. In other words, the token generated may have a value indicating whether the watchdog component has timed out or not. In some embodiments, the watchdog component 310 generates the token 313, the watchdog component 110 generates the token 113, the watchdog component 130 generates the token 133, the watchdog component 330 generates the token 333, the watchdog component 350 generates the token 353, and the watchdog component 370 generates the token 373.

It is appreciated that each watchdog component is configured to receive a token from each of its neighboring watchdog components that it is connected to. For example, the watchdog component 310 receives the token 113 from the watchdog component 110 as well as receiving the token 333 from the watchdog component 330. The watchdog component 110 receives the token 133 from the watchdog component 130, the token 313 from the watchdog component 310, the token 333 from the watchdog component 330, and the token 353 from the watchdog component 350. The watchdog component 130 receives the token 373 from the watchdog component 370, the token 113 from the watchdog component 110, and the token 353 from the watchdog component 350. The watchdog component 370 receives the token 133 from the watchdog component 130. The watchdog component 350 receives the token 133 from the watchdog component 130 as well as receiving the token 113 from the watchdog component 110. The watchdog component 330 receives the token 113 from the watchdog component 110 as well as receiving the token 313 from the watchdog component 310.

It is appreciated that a watchdog may time out if its received kick signal indicates that the function being monitored is inactive or if the kick signal is not received within the prescribed time interval. Furthermore, the watchdog may time out if any of its neighboring watchdog components times out. For example, the watchdog component 310 may time out if the kick signal 322 is not received within the prescribed time interval. The watchdog component 310 may also time out if any of the tokens 113 or 333 are not received within a given time interval or if the received token indicates that the originating watchdog component has timed out, e.g., the token 113 may indicate that the watchdog component 110 has timed out. Similarly, the watchdog component 110 may time out if the kick signal 122 is not received within the prescribed time interval. The watchdog component 110 may also time out if any of the tokens 313, 133, 333, or 353 are not received within a given time interval or if the received token indicates that the originating watchdog component has timed out, e.g., the token 313 may indicate that the watchdog component 310 has timed out, the token 333 may indicate that the watchdog component 330 has timed out, the token 353 may indicate that the watchdog component 350 has timed out, or the token 133 may indicate that the watchdog component 130 has timed out. It is appreciated that every watchdog component operates substantially similar to that of watchdog 310 and 110 in timing out if their respective kick signal is not received within the allowed time interval or if any of its neighboring watchdog components has timed out.

For illustrative purposes, it is assumed that watchdog component 130 times out, e.g., because watchdog component 370 times out or its respective monitored function becomes inactive. Once the watchdog component 130 times out, its neighboring watchdog components either do not receive a token from the watchdog component 130 or one is received it may indicate that the watchdog component 130 has timed out. As such, the watchdog components 110, 350, and 370 that are connected to the watchdog 130 either do not receive the token 133 or if one is received it indicates that the watchdog component 130 has timed out. As such, the watchdog components 110, 350, and 370 time out. The neighboring watchdog components for the watchdog components 110, 350 and 370 also subsequently time out. For example, the watchdog components 330 and 310 that receive the token 113 from the watchdog component 110 may either receive a token indicating that the neighboring watchdog component 110 has timed out or they may not receive any token. As such, the watchdog components 310 and 330 also time out. In other words, a watchdog component timing out has a ripple effect throughout the distributed watchdog system where each watchdog system is eventually timed out.

Accordingly, the security risk associated with a single point of failure/attack is alleviated. Moreover, the distributed nature of the watchdog system alleviates the heavy burden (resources/processing) from one single point and distributes it amongst the watchdogs.

Figure 4:
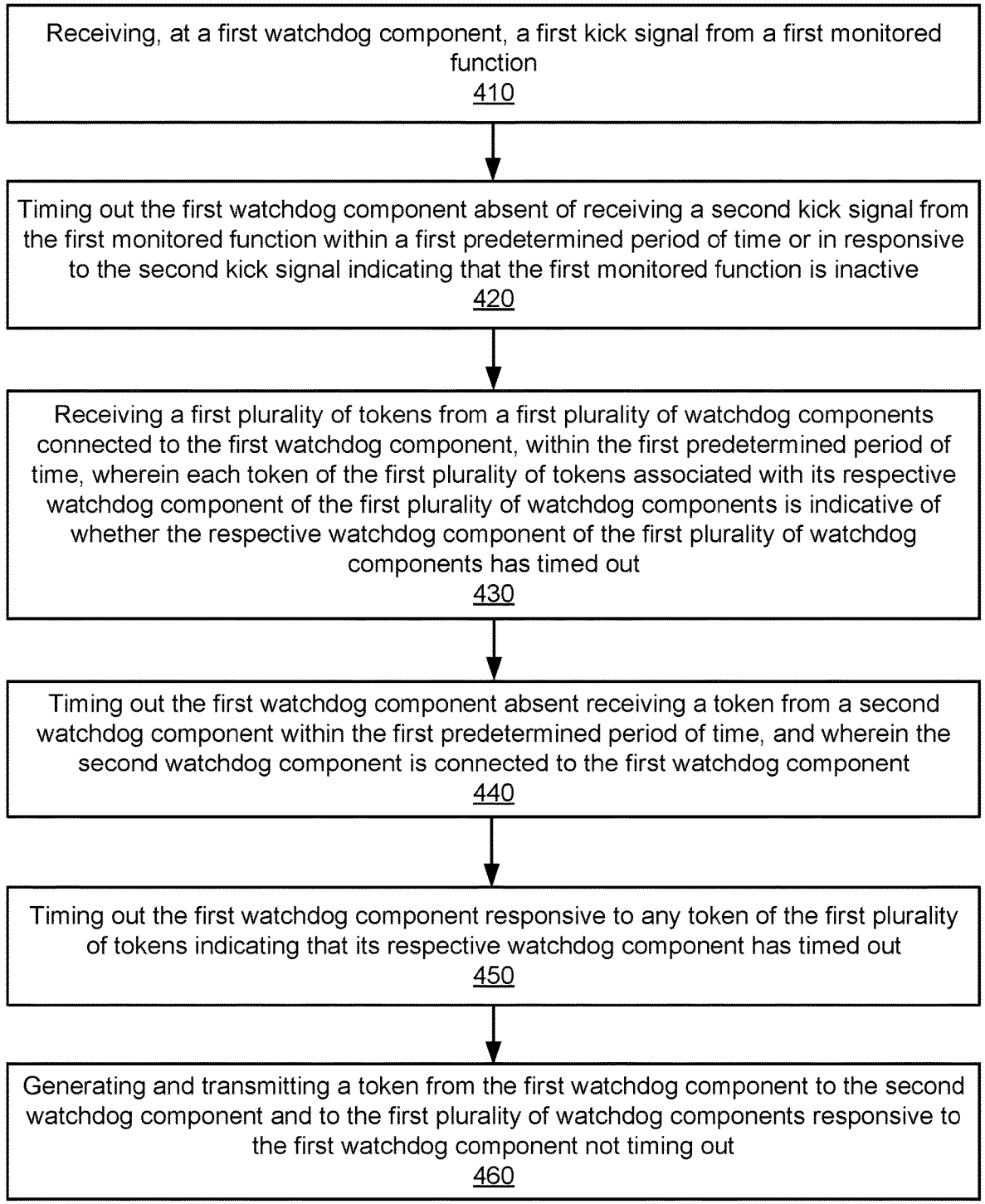
FIG. 4 shows a method of implementing a distributed watchdog system, according to some examples.

FIG. 4 shows a method of implementing a distributed watchdog system, according to some examples. At step 410, a first kick signal is received from a first monitored function, at a first watchdog component, as described above with respect to FIGS. 1-3. As discussed, the first kick signal may be indicative of whether the first monitored function is active or inactive. It is appreciated that absence of receiving the kick signal within the time interval may be an indicative that the function being monitored is inactive. At step 420, the first watchdog component is timed out absent of receiving a second kick signal from the first monitored function within a first predetermined period of time or in responsive to the second kick signal indicating that the first monitored function is inactive, as described with respect to FIGS. 1-3. At step 430, a first plurality of tokens is received from a first plurality of watchdog components connected to the first watchdog component, within the first predetermined period of time. It is appreciated that each token of the first plurality of tokens may be associated with its respective watchdog component of the first plurality of watchdog components and indicative of whether the respective watchdog component of the first plurality of watchdog components has timed out, as described above with respect to FIGS. 1-3. At step 440, the first watchdog component is timed out absent receiving a token from a second watchdog component within the first predetermined period of time, as described above with respect to FIGS. 1-3. The second watchdog component is connected to the first watchdog component. At step 450, the first watchdog component is timed out responsive to any token of the first plurality of tokens indicating that its respective watchdog component has timed out. At step 460, a token is generated and transmitted from the first watchdog component to the second watchdog component and to the first plurality of watchdog components responsive to the first watchdog component not timing out, as described above with respect to FIGS. 1-3.

It is appreciated that the time intervals to receive the kick signals and/or the tokens from respective neighboring watchdog components may be programmable, e.g., user programmable. It is also appreciated that subsequent to the generating and transmitting the token, additional tokens may be generated and transmitted within regular intervals to the second watchdog component and further to the first plurality of watchdog components if the first watchdog component has not timed out.

Figure 5:
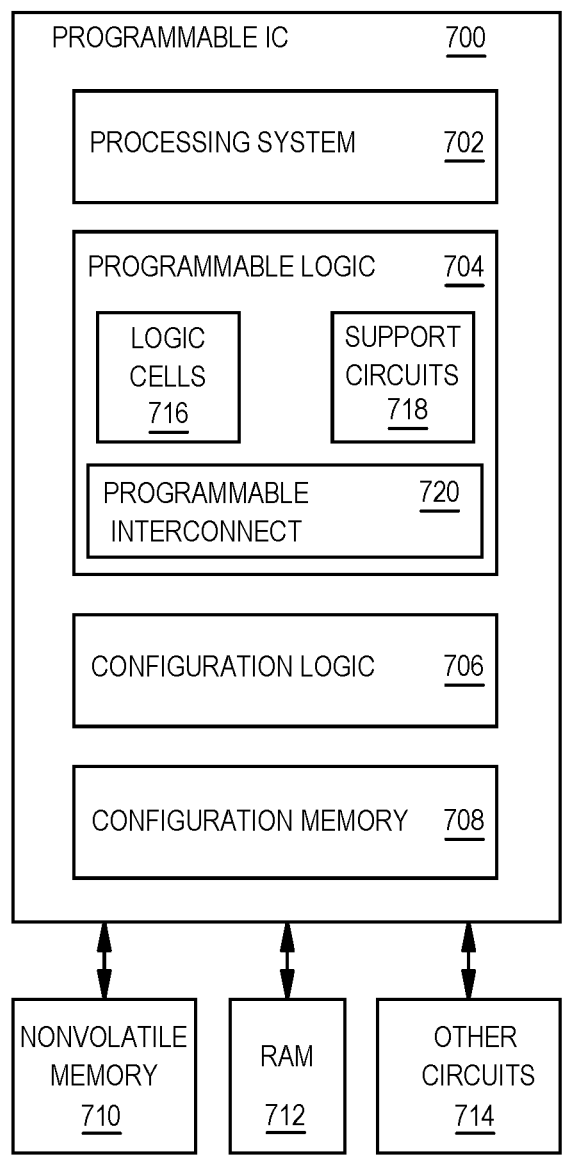
FIG. 5 is a block diagram depicting a programmable integrated circuit (IC), according to some examples.

FIG. 5 is a block diagram depicting a programmable integrated circuit (IC) 700 according to an example. The programmable IC 700 can implement the integrated circuit (IC) chip of systems of FIGS. 1-4, in whole or in part. The programmable IC 700 includes a processing system 702, programmable logic 704, configuration logic 706, and configuration memory 708. The programmable IC 700 can be coupled to external circuits, such as nonvolatile memory 710, RAM 712, and other circuits 714.

In the illustrated example, the processing system 702 can include microprocessor(s), memory, support circuits, IO circuits, and the like. The programmable logic 704 includes logic cells 716, support circuits 718, and programmable interconnect 720. The logic cells 716 include circuits that can be configured to implement general logic functions of a plurality of inputs. The support circuits 718 include dedicated circuits, such as transceivers, input/output blocks, digital signal processors, memories, and the like. The logic cells and the support circuits 718 can be interconnected using the programmable interconnect 720. Information for programming the logic cells 716, for setting parameters of the support circuits 718, and for programming the programmable interconnect 720 is stored in the configuration memory 708 by the configuration logic 706. The configuration logic 706 can obtain the configuration data from the nonvolatile memory 710 or any other source (e.g., the RAM 712 or from the other circuits 714).

FIG. 6 illustrates an FPGA implementation of the programmable IC 700 that includes a large number of different programmable tiles including configurable logic blocks ("CLBs") 730, random access memory blocks ("BRAMs") 732, signal processing blocks ("DSPs") 734, input/output blocks ("IOBs") 736, configuration and clocking logic ("CONFIG/CLOCKS") 738, digital transceivers 740, specialized input/output blocks ("I/O") 742 (e.g., configuration ports and clock ports), and other programmable logic 744 such as digital clock managers, system monitoring logic, and so forth. The FPGA can also include PCIe interfaces 746, analog-to-digital converters (ADC) 748, and the like.

In some examples, each programmable tile in an FPGA can include at least one programmable interconnect element ("INT") 750 having connections to input and output terminals 752 of a programmable logic element within the same tile, as shown by examples included in FIG. 8. Each programmable interconnect element 750 can also include connections to interconnect segments 754 of adjacent programmable interconnect element(s) in the same tile or other tile(s). Each programmable interconnect element 750 can also include connections to interconnect segments 756 of general routing resources between logic blocks (not shown).

The general routing resources can include routing channels between logic blocks (not shown) comprising tracks of interconnect segments (e.g., interconnect segments 756) and switch blocks (not shown) for connecting interconnect segments. The interconnect segments of the general routing resources (e.g., interconnect segments 756) can span one or more logic blocks. The programmable interconnect elements 750 taken together with the general routing resources implement a programmable interconnect structure ("programmable interconnect") for the illustrated FPGA.

In an example of implementation, a CLB 730 can include a configurable logic element ("CLE") 760 that can be programmed to implement user logic plus a single programmable interconnect element ("INT") 750. A BRAM 732 can include a BRAM logic element ("BRL") 762 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 734 can include a DSP logic element ("DSPL") 764 in addition to an appropriate number of programmable interconnect elements. An IOB 736 can include, for example, two instances of an input/output logic element ("IOL") 766 in addition to one instance of the programmable interconnect element 750. As will be clear to those of skill in the art, the actual I/O pads connected, for example, to the input/output logic element 766 typically are not confined to the area of the input/output logic element 766.

In the pictured example, a horizontal area near the center of the die is used for configuration, clock, and other control logic. Vertical columns 768 extending from this horizontal area or column are used to distribute the clocks and configuration signals across the breadth of the FPGA.

In some examples, FPGAs utilizing the architecture illustrated in FIG. 6 include additional logic blocks that disrupt the regular columnar structure making up a large part of the FPGA. The additional logic blocks can be programmable blocks and/or dedicated logic. Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. An integrated circuit (IC) device, comprising:
 a plurality of watchdog circuits,
  wherein each watchdog circuit of the plurality of watchdog circuits is configured to receive a kick signal from a respective monitored function to determine whether the monitored function is active,
  and wherein the each watchdog circuit is further configured to receive a respective token from all watchdog circuits that the each watchdog circuit is connected to, and wherein the respective token determines whether its respective watchdog circuit has timed out, and wherein the each watchdog circuit is further configured to generate a token responsive to the kick signal and further responsive to the respective token from all watchdog circuits that the each watchdog circuit is connected to, and wherein the each watchdog circuit is further configured to transmit the generated token to the all watchdog circuits that the each watchdog circuit is connected to.

2. The IC device of claim 1, wherein absence of receiving the kick signal indicates that the monitored function is inactive.

3. The IC device of claim 1, wherein absence of receiving a respective token from one watchdog circuit of the all watchdog circuits indicates that the one watchdog circuit has timed out.

4. The IC device of claim 1, wherein the token is generated in response to the kick signal indicating that the monitored function is active and further in response to receiving the respective token from the all watchdog circuits that the each watchdog circuit is connected and indicating that the all watchdog circuits that the each watchdog circuit is connected to have not timed out.

5. The IC device of claim 1, wherein
a timer associated with the each watchdog circuit is reset responsive to the kick signal indicating that the monitored function is active and further in response to receiving the respective token from the all watchdog circuits that the each watchdog circuit is connected to indicating that the all watchdog circuits that the each watchdog circuit is connected to have not timed out.

6. The IC device of claim 1, wherein the each watchdog circuit of the plurality of watchdog circuits determines that the monitored function is active if the kick signal from its monitored function is received within a first predetermined period of time.

7. The IC device of claim 6, wherein the each watchdog circuit of the plurality of watchdog circuits generates the token in response to receiving the kick signal within the first predetermined period of time and further in response to receiving the respective token from the all watchdog circuits within a second predetermined period of time that the each watchdog circuit is connected to.

8. The IC device of claim 1, wherein the monitored functions are associated with a plurality of circuits distributed across a single die.

9. The IC device of claim 1, wherein monitored functions are associated with a plurality of circuits distributed across multiple dies, and wherein a configuration of the plurality of circuits is a 2.5D or 3D configuration.

10. An integrated circuit (C) device, comprising:
a first watchdog circuit configured to receive a first plurality of kick signals from a first monitored function, wherein each kick signal of the first plurality of kick signals is received within a first period of time and at regular intervals from one another, and wherein each kick signal of the first plurality of kick signals determines whether the first monitored function is active, and wherein the first watchdog circuit times out if a kick signal of the first plurality of kick signals is not received within the first period of time; and
a first plurality of watchdog circuits connected to the first watchdog circuit, wherein each watchdog circuit of the first plurality of watchdog circuit is configured to generate and transmit a token within a second period of time to the first watchdog circuit at regular intervals indicating whether the each watchdog circuit or any other watchdog circuits connected that the each watchdog circuit is connected to has timed out,
and wherein the first watchdog circuit is configured to receive tokens from the first plurality of watchdog circuits connected thereto,
and wherein the first watchdog circuit is further configured to generate and transmit a token to the first plurality of watchdog circuits in response to the first watchdog circuit not timing out and further in response to the received tokens indicating that the each watchdog circuit of the first plurality of watchdog circuits and its respective watchdog circuits connected thereto have not timed out.

11. The IC device of claim 10, wherein absence of receiving the each kick signal of the first plurality of kick signals within the first period of time indicates that the first monitored function is inactive.

12. The IC device of claim 10, wherein absence of receiving a respective token from one watchdog circuit of the first plurality of watchdog circuits indicates that the one watchdog circuit has timed out.

13. The IC device of claim 12, wherein the one watchdog circuit times out responsive to absence of receiving a kick signal from its respective monitored function within a predetermined period of time or in response to any one of its watchdog circuits connected thereto timing out.

14. The IC device of claim 10, wherein the first watchdog circuit times out responsive to any watchdog circuit of the first plurality of watchdog circuits timing out.

15. A method, comprising:
receiving, at a first watchdog circuit, a first kick signal from a first monitored function, wherein the first kick signal is indicative of whether the first monitored function is active or inactive;
timing out the first watchdog circuit absent of receiving a second kick signal from the first monitored function within a first predetermined period of time or in responsive to the second kick signal indicating that the first monitored function is inactive;
receiving a first plurality of tokens from a first plurality of watchdog circuits connected to the first watchdog circuit, within the first predetermined period of time, wherein each token of the first plurality of tokens associated with its respective watchdog circuit of the first plurality of watchdog circuits is indicative of whether the respective watchdog circuit of the first plurality of watchdog circuits has timed out;
timing out the first watchdog circuit absent receiving a token from a second watchdog circuit within the first predetermined period of time, and wherein the second watchdog circuit is connected to the first watchdog circuit;
timing out the first watchdog circuit responsive to any token of the first plurality of tokens indicating that its respective watchdog circuit has timed out; and
generating and transmitting a token from the first watchdog circuit to the second watchdog circuit and to the first plurality of watchdog circuits responsive to the first watchdog circuit not timing out.

16. The method of claim 15, wherein a watchdog circuit within the first plurality of watchdog circuits times out responsive to a failure to receive a kick signal within a predetermine period of time or in response to receiving a kick signal indicating that its monitored function is inactive.

17. The method of claim 15, wherein a watchdog circuit within the first plurality of watchdog circuits times out responsive to any watchdog circuit connected thereto timing out or responsive to absent of receiving a token from any watchdog circuit connected thereto with a predetermined period of time.

18. The method of claim 15, wherein each watchdog circuit of the first plurality of watchdog circuits is associated with its own monitored function.

19. The method of claim 15 further comprising receiving the first predetermined period of time from a user.

20. The method of claim 15 further comprising subsequent to the generating and transmitting the token, generating and transmitting additional tokens within regular intervals to the second watchdog circuit and further to the first plurality of watchdog circuits if the first watchdog circuit has not timed out.

\* \* \* \* \*

UNITED STATES PATENT AND TRADEMARK OFFICE
CERTIFICATE OF CORRECTION

| | | |
|---|---|---|
| PATENT NO. | : 11,579,957 B1 | Page 1 of 1 |
| APPLICATION NO. | : 16/938764 | |
| DATED | : February 14, 2023 | |
| INVENTOR(S) | : Edward S. Peterson, Trevor W. Hardcastle and Carl H. Carmichael | |

It is certified that error appears in the above-identified patent and that said Letters Patent is hereby corrected as shown below:

In the Claims

Column 13, Line 51, In Claim 10, delete "(C)" and insert -- (IC) --, therefor.

Signed and Sealed this
Nineteenth Day of September, 2023

Katherine Kelly Vidal
*Director of the United States Patent and Trademark Office*